P. Hayden,
Brick Machine.

Nº 67,541. Patented Aug. 6, 1867.

Witnesses.
Theo Fische
Wm Trewin

Inventor.
P Hayden
Per Munn & Co

United States Patent Office.

P. HAYDEN, OF PITTSBURG, PENNSYLVANIA.

Letters Patent No. 67,541, dated August 6, 1867.

---

IMPROVED BRICK MACHINE.

---

The Schedule referred to in these Letters Patent and making part of the same.

---

TO ALL WHOM IT MAY CONCERN:

Be it known that I, P. HAYDEN, of Pittsburg, Allegheny county, Pennsylvania, have invented a new and improved Brick Machine; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention relates to a brick machine of that class in which the clay is pressed into a revolving mould-wheel, is then carried in the same to the press, which consists of a vertical plunger and corresponding mould, between which the clay is pressed into the required shape, and is then carried by the wheel to an endless apron, whence the completely moulded and pressed brick may be carried to the drying-apparatus.

First. My invention consists in the general arrangement of the mould-wheel and plungers for pressing and forming the brick.

Second. It consists in the device for discharging the brick upon an endless apron.

A represents a bed or platform, made of wood or other suitable material, and resting upon suitable supports B, all of which are of sufficient strength to sustain the other parts of this machine. Below the bed A are arranged, in the supports B, bearings for a horizontal shaft, C, to which rotary motion is imparted by a belt passing over a pulley that is mounted on the shaft, or by a crank, D, or other suitable device. E is a vertical shaft that passes up through the bed A into the circular receptacle F in which the clay is mixed. The same is revolved by means of bevel gear-wheels $a$ and $b$, attached, respectively, to the shafts C and E, as is clearly shown in fig. 3. To the shaft E are attached horizontal stirrers G and G′, which mix and knead the clay that is placed into the pan F. An opening or outlet, $c$, is arranged through the bottom of the vessel F, below which is arranged a revolving horizontal mould-wheel, H, which is provided with a series of oblong perforations, of which one after the other is brought below the outlet $c$ of the vessel F. The stirrers are of two kinds. The arms G sweep over the bottom of the vessel F, and reach just to the inner edge of the hole $c$, so that, as the shaft E revolves, the clay will be swept by these arms over the hole $c$. The arms G′ are arranged so as to be elevated above the bottom of the vessel F, and extend to the rim of the same, and have at their outer end an oblique scraper, $d$, attached, which extends down to the bottom of the vessel, and which at once forces the clay down through the opening $c$, and, in connection with a knife, $e'$, arranged at one end of the opening $c$, it separates the clay in the opening from that in the vessel, thereby regulating the amount of clay necessary for each brick. By increasing the size and capacity of the vessel F, the number of the arms G and G′ will have to be increased. If desired, a mill for grinding the clay may be arranged above the vessel F.

Figure 3:
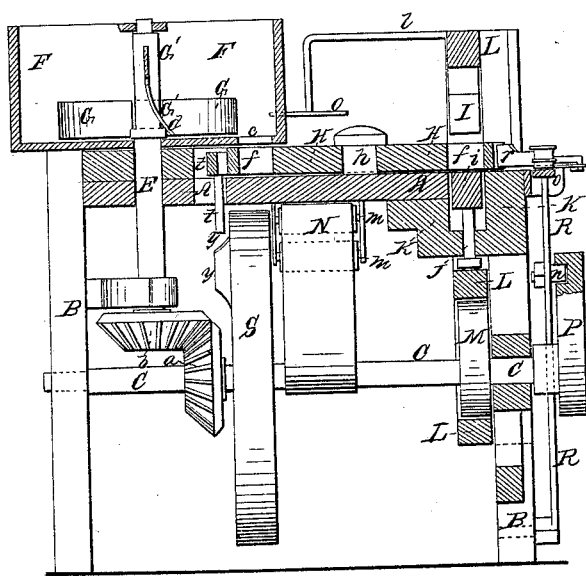
Figure 3 is a vertical sectional view of the same, the plane of section being indicated by the line $x\,x$, fig. 1.
Figure 4:
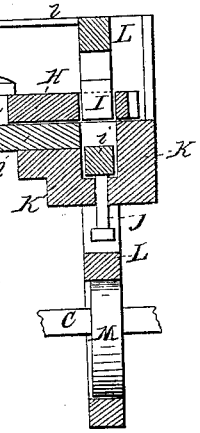

The mould-wheel H is a circular disk, the thickness of which corresponds to the height of the brick before they are pressed. As before said, this disk is provided with oblong perforations $f\,f$, the dimensions of which correspond to the size of the brick to be formed. The circumference of this wheel or disk is provided with teeth $g$, the number of holes $f$ being equal to that of the teeth or projections $g$. After a hole, $f$, has been filled with clay, the wheel turns on its axis $h$, by a device to be hereinafter described, until it arrives below the plunger I. During the motion of the wheel H the clay in the holes $f$ slides upon the bed A. When below the plunger the clay rests upon a metal bottom, $i$, which slides up and down in a mould, K, that is secured stationary in the bed A, as shown in figs. 3 and 4. The plunger I is secured to a frame, L, which is moved up and down by a cam, M, secured to the shaft C, and working in an elongated slot in the frame, as is shown in fig. 3. When the clay arrives below the plunger the parts are in the position shown in fig. 3; that is, the plunger I is up, and the bottom $i$ is also level with the bed A, being held up by a part of the frame L, which presses against the under side of a stem, $j$, that is attached to the bottom $i$. The cam M then gradually depresses the frame L, and the bottom is lowered, and also the plunger, until the parts are in the position shown in fig. 4; that is, the brick is in the mould K, the bottom $i$ is lowered as far as possible, and also the plunger. The downward motion of the bottom $i$ does not follow that of the frame, as the bottom is detained by shoulders formed below it in the mould. The brick is thereby pressed, as the plunger descends with the full stroke of the frame L, and the bottom $i$ only moves a part of that distance. When the brick has been thus pressed and moulded, the frame L is elevated again, and the plunger is raised, as well as the bottom $i$, until the latter is again on a level with the bed A. The wheel H then turns again and carries the brick around until it arrives over a hole in the bed, below which an endless apron, N, moves. The brick falls upon this apron, and is carried thereon to the drying-chambers, or to any other suitable place. A follower, O, connected by an arm, $b$, to the reciprocating frame L, is arranged above the disk H in such a position that it will force the brick down upon the apron, and also clean the hole in which the brick was, so as to prepare the same for further operations. The apron N may be operated from the shaft C, and pass over rollers $m$ $m$, so as to be as near to the bed A as possible.

Figure 1:
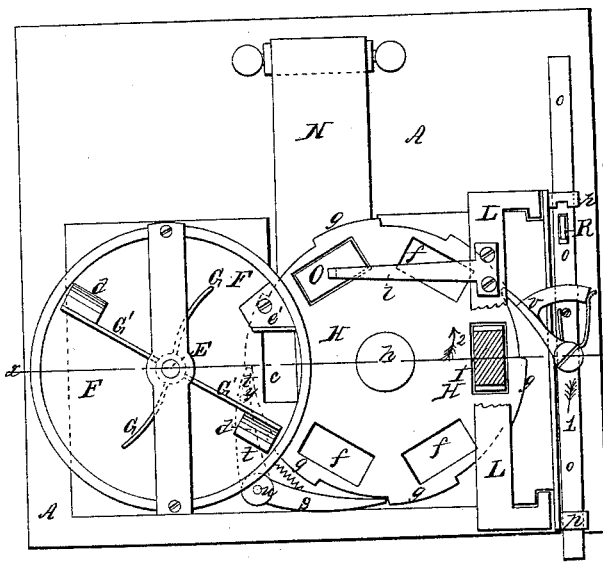
Figure 1 is a plan or top view, partly in section, of my improved brick machine.
Figure 2:
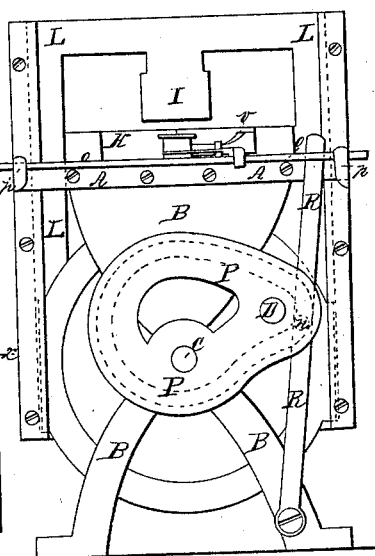
Figure 2 is an end elevation of the same.

Motion is imparted to the wheel H by the following device: A cam, P, mounted upon the shaft C, is provided with a curvilinear groove, as indicated by dotted lines in fig. 2, into which a friction-roller or pin, $n$, fits, that is secured to a lever, R. The lower end of this lever is pivoted to the support B, as shown, and the form of the groove in the cam P is such that the upper end of the lever will move back and forth, and will impart oscillating motion to a horizontal sliding-bar, $o$, that is arranged outside of the bed A, and guided in ears $p$, as shown in figs. 1 and 2. To the bar $o$ is pivoted a spring-catch or pawl, $r$, that is always pressed against the edge of the wheel H, and as the bar $o$ moves in the direction of the arrow 1, in fig. 1, this pawl will be moved over another one of the teeth on the wheel. When, then, the bar $o$ moves in the opposite direction, the pawl $r$ will carry the wheel around in the direction of the arrow 2, shown in fig. 1. It will be observed that only once during each revolution of the shaft C is the wheel H moved the distance of one tooth.

While the clay is being placed into one hole, $f$, while the brick is being pressed below another hole, $f$, and while the brick is being thrown out of a third hole, $f$, and while the latter is being cleaned, the wheel must remain stationary, and as the friction of the pawl $r$, when moving in the direction of the arrow 1, would tend to move the wheel a little, and as the slightest motion of the latter, during one of the above operations, would bring the whole mechanism into disorder, I have found it necessary to prepare a stop for the wheel, whereby the same is firmly locked when it is to remain stationary. This stop consists of two pawls $s$ and $t$, shown in fig. 1, the latter by dotted lines, which pawls are pivoted to the bed A by a pin, $u$, and which are forced towards the edge of the wheel $y$, and against the edges of the teeth on the wheel H, by a spring, $w$, as shown. The pawl $s$ prevents the wheel from turning back and the pawl $t$ from turning forward. The former is never thrown off the wheel, as the latter should never turn backward. But the pawl $t$ is provided at its under side with a pin, $t'$, projecting through a slot in the bed A, as shown in fig. 3. A cam, $y$, is attached to the rim of a fly-wheel, S, that is mounted on the shaft C, or to an arm or other device secured to the said shaft, which cam strikes against the pin $t'$, and throws the pawl $t$ out of gear just while the wheel H is being turned forward by the pawl $r$. Then the cam $y$ is moved away from the pin $t'$, and the spring $w$ throws the pawl $t$ into gear again.

It will be easily understood that, by changing the form of the groove in the cam P, the bar $o$ can be moved twice or three or more times during each revolution of the shaft C, and the wheel H will be moved as often by the pawl $r$. Of course the shape of the cam M would then also have to be changed, and the number of holes $f$ of the cams and of stirrers G and G' be multiplied.

It will be seen that this machine is of very compact and simple construction, and there are no parts that can easily get out of order. It completes a brick, so as to be ready for the drying process, from the clay that is thrown into the vessel F. It is evident that brick of any suitable shape, material, and appearance can be rolled and pressed in this machine. The apron can be of any suitable length.

Having thus described my invention, what I claim as new, and desire to secure by Letters Patent, is—

1. The reciprocating frame L, so combined with the plunger I, sliding-bottom $i$, and mould K, and so constructed that, by its downward movement, the brick will be compressed in the mould K, as set forth.

2. The grooved cam P, in combination with the levers R and $o$ and spring-catch $r$, all made as described, and operating so that by revolving the cam P the lever $o$ will be moved back and forth and the wheel H be operated.

3. The device for locking the wheel H, consisting of the spring-pawls $s$ and $t$, the latter being provided with a projecting pin or lug, $t'$, which is operated by a single cam substantially as set forth.

4. The follower O, when secured to the reciprocating frame L, in combination with the mould-wheel H, all made and operating substantially as herein shown and described.

5. The stirrers G', provided with the oblique arms $d$, in combination with the knife $c'$, at one end of the opening $c$, whereby the amount of clay necessary for each brick is regulated, as herein shown and described.

P. HAYDEN.

Witnesses:
   Wm. F. McNamara,
   Alex. F. Roberts.